United States Patent
Fenton

(10) Patent No.: US 9,846,693 B2
(45) Date of Patent: Dec. 19, 2017

(54) DOCUMENT TRACKING IN HETEROGENEOUS APPLICATION ENVIRONMENTS

(75) Inventor: Charles Stanley Fenton, Ypsilanti, MI (US)

(73) Assignee: IBM INTERNATIONAL GROUP BV, Amsterdam (NL)

( * ) Notice: Subject to any disclaimer, the term of this patent is extended or adjusted under 35 U.S.C. 154(b) by 1978 days.

(21) Appl. No.: 12/842,284

(22) Filed: Jul. 23, 2010

(65) Prior Publication Data

US 2012/0023063 A1  Jan. 26, 2012

(51) Int. Cl.
- *G06F 17/00* (2006.01)
- *G06F 17/30* (2006.01)
- *G06F 17/22* (2006.01)
- *G06Q 10/10* (2012.01)

(52) U.S. Cl.
CPC .... *G06F 17/30011* (2013.01); *G06F 17/2247* (2013.01); *G06F 17/30864* (2013.01); *G06F 17/30917* (2013.01); *G06Q 10/10* (2013.01)

(58) Field of Classification Search
CPC ........... G06F 17/30011; G06F 17/2247; G06F 17/30917; G06F 17/30864; G06Q 10/10
USPC ........................................ 715/229, 200, 273
See application file for complete search history.

(56) References Cited

U.S. PATENT DOCUMENTS

| | | | |
|---|---|---|---|
| 2006/0080353 A1* | 4/2006 | Miloushev et al. | 707/102 |
| 2009/0265608 A1* | 10/2009 | Molenaar | 715/234 |
| 2010/0245938 A1* | 9/2010 | Coley et al. | 358/474 |

* cited by examiner

*Primary Examiner* — Quoc A Tran
(74) *Attorney, Agent, or Firm* — Steven M. Greenberg, Esq.; CRGO Law

(57) ABSTRACT

A method of naming documents according to a document naming convention (DNC) includes receiving, from any of a plurality of data processing applications (DPAs) within an enterprise, a request for a document name and generating a document name "infix" portion in compliance with the DNC for inclusion in the document name. The prefix may be descriptive of a characteristic of the document and the suffix may indicate a document type, a document format, or both. The infix may include a fixed portion and a modifiable portion. The fixed portion may include a datestamp and a document unification identifier. The infix may include a variable portion that can be modified by a DPA that creates a new or modified document, but the name of the modified document maintains the fixed portion of the original document.

5 Claims, 6 Drawing Sheets

200 ↘

| PREFIX 202 | INFIX 204 | SUFFIX 206 |

| FIXED PORTION 302 | VARIABLE PORTION 304 |

| TIME STAMP 402 | DOCUMENT UNIFICATION IDENTIFIER (DUID) 404 |

FIG. 4

DOCUMENT TRACKING IN HETEROGENEOUS APPLICATION ENVIRONMENTS

BACKGROUND

Field of the Disclosure

The present disclosure relates to document management and, more particularly, to managing the naming of documents within an enterprise employing heterogeneous applications.

Description of the Related Art

Business documents in diverse vertical industries are typically processed by multiple applications that execute on different computing systems and platforms in different virtual and geographic locations. These diverse systems and applications cooperate to achieve specific objectives of the business. From the perspective of a business document employed within the enterprise, this cooperation may be characterized as a processing flow in which a document may pass through one or more of the diverse systems, possibly undergoing transformations in name, content, structure, formatting, and so forth.

BRIEF DESCRIPTION OF THE DRAWINGS

FIG. 2 is a depiction of an exemplary implementation of a document name;

FIG. 3 depicts additional detail of selected aspects of an infix portion of the document name depicted in FIG. 2;

FIG. 4 depicts additional detail of selected aspects of a fixed portion of the document name infix depicted in FIG. 3;

DESCRIPTION OF THE EMBODIMENT(S)

Figure 1:
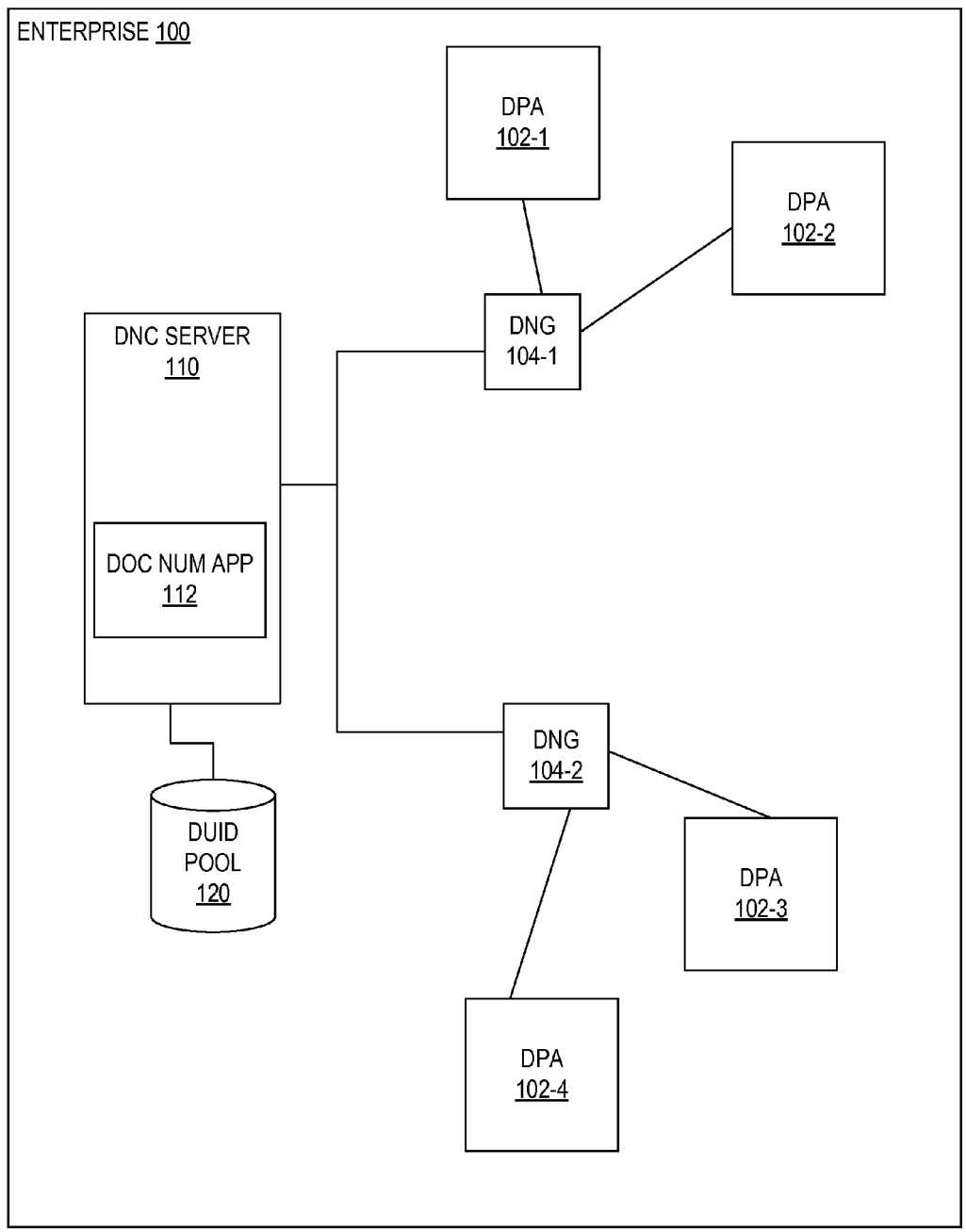
FIG. 1 is a block diagram of selected elements of an enterprise implementing a document naming convention.

Traditionally, heterogeneous applications operating within an enterprise typically lack an explicit mechanism for conveying a relationship between a document created, modified, or otherwise processed by one application based on an original document created by a different application, possibly on a different system. Consequently, it is difficult to track the ancestors and descendants, including how many child documents were generated from an original document or how many original documents may have been aggregated into a particular document.

Within an enterprise, a database may exist to collect and organize document event records generated by the applications that the enterprise employs. Associations may be made through points of entry and exit, application interfaces, and document characteristics. These associations may be tied together through tabular link lists that evolve to a complex set of relationships correlating the document flow through the application cloud.

When, however, applications do not perform as expected or events do not get generated, the information that is critical to maintaining accurate document "visibility" is missing or discontinuous. The complexity of the relationships makes for a resource-intensive visibility system that tends to be fragile such that the loss of one event might result in substantial loss of visibility.

Disclosed herein is a uniform document naming and identification mechanism to support tracking a document within an enterprise, cloud, or cloud-like computing environment where multiple and differing (heterogeneous) applications may process a document. Disclosed mechanisms support visibility enabling users to determine the history of any document, the number of descendant generations of a document, how many child documents were generated by the original document, what, if any, documents are aggregated to a particular document, and so forth.

In one aspect, a disclosed method of naming documents according to a document naming convention (DNC) includes receiving, from any of a plurality of document processing applications (DPAs) within an enterprise, a request for a document name and generating, by a document name generator (DNG), a document name "infix" portion in compliance with the DNC. The infix portion is then included, along with a prefix and a suffix, in the document name. The document name is then sent to the DPA that generated the request.

The prefix may be descriptive of a characteristic of the document, e.g., "ORDER" for a document that represents a purchase order. The suffix may indicate a document type, a document format, or both, e.g., "EDI," "XML," "IDOC," etc. In some embodiments, generating the infix may include generating a fixed portion and a modifiable portion. The fixed portion may include a datestamp indicative of a particular point in time such as, for example, the time when the fixed portion is generated or the time when the document name request was generated, transmitted, or received. The fixed portion may also include a document unification identifier (DUID). In some embodiments, the DUID is an n-character alphanumeric string where the number of characters is preferably sufficient to accommodate a large number of unique DUIDs, but sufficiently low to provide DUIDs that are relatively easy to recall and manipulate. In some implementations, for example, the number of characters in the DUIDs may be in the range of five to seven.

Generating the DUID may include accessing a pool of predetermined DUIDs. A DNC server may allocate the predetermined DUIDs among the DPAs periodically or from time to time so that a pool of predetermined DUIDs is allocated to each of the DPAs. The allocating of DUIDs may include determining a number of predetermined DUIDs to allocate for each of the plurality of DPAs based on a number of requests expected during a specified interval from each of the plurality of DPAs. The number of predetermined DUIDs allocated to each of the DPAs may be a factor of M times the expected number of requests, where M is greater than one. In some embodiments, for example, approximately two to four times the number of expected DUIDs are allocated to each DPA.

In another aspect, a disclosed data processing system includes a processor having access to executable instructions, stored in a computer readable medium where the instructions include instructions to allocate, from time to time, availability for a pool of DUIDs among a plurality of DPAs. Responsive to receiving a document name request from a DNG on behalf of a DPA associated with the DNG, a DUID may be acquired from a plurality of available DNGs allocated to the DPA. The acquired DUID may then be provided to the requesting DNG for use in naming a document. The DUID pool may then be modified to indicate the acquired DUID as being unavailable. The instructions may further include instructions to generate a timestamp based on a time associated with the document name request and provide the timestamp to the DNG. The acquired DUID and the timestamp may be included in an infix portion of a document name. The instructions may further include instructions to generate a unique serial identifier (USI) and provide the USI to the DNG. Allocation of the DUIDs among the DPAs may be based on numbers of requests associated with the DPAs expected based on historical data.

In yet another aspect, disclosed herein is a computer readable storage medium containing embedded, processor-executable instructions for processing documents according to a document naming convention where the instructions include instructions to send, in response to accessing an originating document not having a DNC-compliant document name, a document name request to a DNG. In response to receiving at least a portion of a DNC-compliant document name from the DNG, the DNC-compliant name is sent to the originating requestor. The DNC-compliant name includes the received portion of the DNC-compliant document name. Responsive to a DPA modifying the originating document to create a modified document, a modified document name, modified in accordance with the DNC, may be generated and the modified document name assigned to the modified document. The modified document name includes the portion of the DNC-compliant document name assigned to the originating document so that the document chain is easily detected or verified from the document names while still permitting users and applications to modify prefix and suffix names of documents to suit particular needs and preferences. In some embodiments, the portion of the DNC-compliant name includes a fixed portion and a variable portion. The fixed portion may include an n-character DUID and a timestamp. Creating the modified document name may include modifying the variable portion of the infix without altering the fixed portion.

In some implementations, a disclosed document naming system may include a DNC, an application, system, or other resource for generating unique identifiers, and a document process convention for using the DNC amongst the participating applications.

In embodiments, disclosed herein, a DNC may mandate a multiple portion document name including a prefix or left-most portion, one or more infix or middle portions, and a suffix or right-most portion. The prefix and suffix may be used to convey conventional document name attributes. The prefix, for example, may describe the function or some other characteristic of the document; e.g., order, acknowledgement, invoice, plan, schedule, etc. The suffix may describe a type of document, a format of the document, or both, e.g., TXT, XML, HTML, IDOC, etc. The infix may include one or more unique identifier(s) created by the DNG. Depending upon the implementation, a "-" (dash) might separate the prefix and infix portions, a "." (period) might separate the suffix from the infix. In the case of aggregation, a "_" (underscore) might separate source component from aggregate infix identifier.

The DNG may be configured to allocate a pool of DUIDs for use by each application in some designated period (hour, day, week, month, etc.). A participating application might request and receive some number of identifiers for use during the designated period. Typically the number of DUIDs allocated to an application for a specific interval might exceed, by a significant safety margin, e.g., 200% to 400%, the number of (original) documents expected based on historical data.

The implementation might include a DNC server that maintains the DUID allocations and a set of DNGs that might share knowledge of the allocations. A set of one or more DNGs might be implemented within an application or system domain of the enterprise. Applications or systems within the domain may query the domain's DNCs for a document number. These distributed generators may have knowledge of the DUIDs and unique identifiers used by all of the other generators in the domain and any new or restarted generator would first query the generator community for established allocations to ensure that any DUID or identifier issued is unique within the enterprise for the specified duration and to provide redundancy in the event of a generator failure.

The format of unique identifiers created by the distributed generators is an implementation detail, but might include an n-character upper case alphanumeric value (A-Z, 0-9) for the DUID or an n-digit number for other unique identifiers. For the case of a 6-character DUID, there would be billions of unique DUIDs, but the six character DUID is, nevertheless, relatively easy to remember and takes up little space in a file name. The format of a DUID could be extended to more or fewer characters and mixed case to adjust the number of unique DUIDs according to the volume of document name requests.

The infix portion of a document name may contain one or more unique identifiers including, as an example, the DUID provided by a generator and a timestamp. For example, the name for a purchase order represented by an XML document might be:

order-YYMMDDhhmmss-001AK3.xml where "order" is the prefix, "xml" is the suffix, and the infix includes a timestamp (YYMMDDhhmmss) and a DUID (001AK3). In some embodiments, the infix includes a fixed portion intended to remain with the document and all of the document's descendants and a variable portion that may be modified by an application, for example, when a document is split into multiple documents, converted to another type of document, or aggregated with other documents. In some embodiments, the variable portion of the infix may include a serial number generated by one of the generators. In this case, the document discussed above may have a document name of the form order-YYMMDDhhmmss-001AK3-000001.xml where the variable portion of the infix is a 6-digit serial number (000001), referred to herein as a USI. In some embodiments, a DPA might request one or more USIs from its generator and begin each period starting at zero and then count up, restarting at zero at each new clock period. The application may periodically check in with the generator to update USI requirements (every x periods for example).

Generally, under a DNC disclosed herein, a document might be named or renamed according to the DNC when the document is first accessed or generated by a DPA that adheres to the DNC. The fixed portion of the infix would be maintained by all subsequent DPAs that access or modify the document. If a DPA splits a document into multiple child documents the variable portion of the infix, preceding the suffix, might be altered for uniqueness.

In some embodiments, an aggregation of multiple original documents would necessitate the renaming (e.g., for archive purposes) of the original documents to indicate the infix portion of the aggregated document. For example: if an aggregated document was named:

order-091218-000124-000010.xml and the document was generated from two source documents:

order-091217-004567-008556.xml and
order-091216-012981-009967.xml the source documents might be renamed, after aggregation, as:

order-091217-004567-008556 091218-000124-000010.xml and order-091216-012981-009967 091218-000124-000010.xml.

In some embodiments, the prefix and suffix are freely changeable to anything useful for the processing and naming of the document, provided the infix portion remains constant within the unique document content.

The disclosed DNC and system for implementing the DNC is relatively lightweight and easily understood by users. The names submitted to a database for tracking don't need to appear in any order to be correlated (by infix). For example if a document went through four applications and the prefix and suffix was changed in the middle two and the middle two failed to report into the visibility data base there would be still the first (origin) entry and the fourth (final destination) entry with the same infix showing where it started and where it ended. In some embodiments, the naming convention may be a switch-selectable option permitting and recommending, but not requiring compliance.

The DNG may be implemented as stand-alone or embedded programs tasked with DUID and USI creation. DNGs may share access to and knowledge of the DUID allocations and USI values so there is no overlap. DNGs may restart the USI count based on some period (e.g., daily). The number of DNGs is not constrained so that there is no bottleneck. DUIDs generators can be widely distributed in a clustered or cloud environment. Locally resident generators can share active DUID assignments for redundancy in cluster operations. USIs may be created and tracked by DUID in generator cache for the period and shared to the clustered generators.

Under the described DNC, the failure of a single generator or the failure of an intervening system failing to report document visibility information is not catastrophic. Assuming all DPAs adhere to the DNC, there is sufficient uniformity in the infix to identify the source or sources of a document and any descendants of the document. Moreover, as much or as little historical detail can be collected in the process chain to fit the visibility requirements of an organization.

Additional facilities can be developed off the disclosed DNC to support service level agreements (SLAs). Given the reception of the document at point of origin and an architectural understanding of end point of processing, a timer (SLA) can be set at the destination end point waiting for the reception document with the same corresponding infix. The prefix and suffix and content format could have changed in the intervening applications, but the infix remains the same and thereby provides a receipt notice.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring now to FIG. 1, a block diagram illustrates selected elements of an embodiment of an enterprise 100 employing disclosed DNC techniques. In the depicted embodiment, enterprise 100 includes a plurality of DPAs 102-1 through 102-4. DPAs 102 represent any of various applications including, as examples, enterprise resource planning applications, database applications, integration applications, and the like. DPAs 102 may be heterogeneous applications that operate on different platforms and may generate or operate on different types of documents including, as examples, extensible markup language (XML) documents, electronic data interface (EDI) documents, text (TXT) documents, intermediate documents (IDOCs), and so forth. (IDOC is a service access point (SAP) format for transferring data for a business transaction.) A purchase order document, for example, may be accessed and processed by the DPAs 102 of enterprise 100 and the DPAs 102 may create modified forms of the document, split the document into multiple documents, aggregate a set of documents, and so forth.

In the embodiment depicted in FIG. 1, the DPAs 102 of enterprise 100 are depicted in communication with a set of one or more distributed document numbering generators referred to herein as DNGs 104. As shown in FIG. 1, an enterprise 100 may include more than one DNG 104 and any given DNG 104 may be coupled to one or more DPAs 102. For example, as depicted in FIG. 1, DPA 102-1 and DPA 102-2 may exist within a common domain that is serviced by DNG 104-1 while DPA 102-3 and DPA 102-4 may reside on a different domain serviced by DNG 104-2. Although this example describes each DNG 104 as being associated with the DPAs 102 of a particular domain, the association between DPAs 102 and DNGs 104 is not so limited and DNGs 104 may be associated with DPAs 102 in substantially any desirable configuration.

FIG. 1 further depicts a DNC Server 110 configured with a document numbering application 112 and a database structure identified as DUID Pool 120 coupled to DNC Server 110. Document number application 112 may represent or encompass a set of instructions, executable by DNC server 110 and stored in a computer readable medium that is accessible to DNC Server 110.

In the depicted embodiment, DNC Server 110 may provide a centralized facility for the maintenance and allocation of DUIDs for use by the distributed DNGs 104. It should be noted that any of the elements depicted in FIG. 1 may be implemented as or within a data processing system or apparatus that includes one or more processors having access to a computer memory or some other form of a computer readable medium. Thus, as suggested by its name, DNC Server 110 may be implemented as a server system, while DPAs 102 and DNGs 104 may each be implemented within distinct data processing systems. Alternatively, any two or more of the elements depicted in FIG. 1 may be integrated within a single physical system.

In addition, FIG. 1 encompasses configurations in which the geographic distances separating the DPAs 102 may be small or large. In some embodiments, it may be preferable to provide DNGs 104 that are local to the DPAs 102 they support for performance and reliability reasons, but this is not an absolute requirement. Similarly, FIG. 1 encompasses any suitable form of network and networking connections among the various elements depicted.

In some embodiments, enterprise 100 implements a DNC that is illustrated in FIGS. 2, 3, and 4, which represent various aspects of a document name according to one implementation of the DNC implemented within enterprise 100. FIG. 2 depicts a document name 200 as including a prefix portion 202 (also referred to herein simply as prefix 202), an infix portion 204 (infix 204), and suffix portion 206 (suffix 206). Prefix 202 may be user or machine alterable to suit the needs of a DPA or user. Prefix 202 may, for example, describe a characteristic, function, or other aspect of the corresponding document. For example, the prefix 202 of a purchase order document may include or consist of the word "order" whereas an invoice document may include or consist of the word "invoice."

The suffix 206 of document name 200 may represent or indicate the "type" or format of a document where "type" is intended to mean a document type from the perspective of a DPA. So, for example, the document types that may be employed within a large enterprise 100 may include, for example, an EDI type, an XML type, an IDOC type and so forth. In these embodiments, the suffix 206 may serve a traditional function of indicating which DPAs 102 can operate on the document.

The infix 204 of document name 200 is or may be entirely a construct of the DNC employed by the enterprise and implemented by DNC Server 110 and DNGs 104. Referring to FIG. 3 and FIG. 4, the depicted implementation of infix 204 includes a fixed portion 302 and a variable portion 304. Fixed portion 302 may represent a document name portion that is not altered by the DNC as the name is applied to documents generated or modified by DPAs 102. Alternatively, variable portion 304 of infix 204 may represent a portion of the document intended to be modifiable by applications to prevent redundant use of document names and to differentiate among documents derived from a common origin. FIG. 4 depicts the fixed portion 302 of infix 204 according to a DNC implementation described herein. In the depicted implementation, In accordance with various embodiments, the methods described herein may be implemented as one or more software programs running on one or more computer processors, which may be located on one or more geographically dispersed physical systems. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

Figure 5:
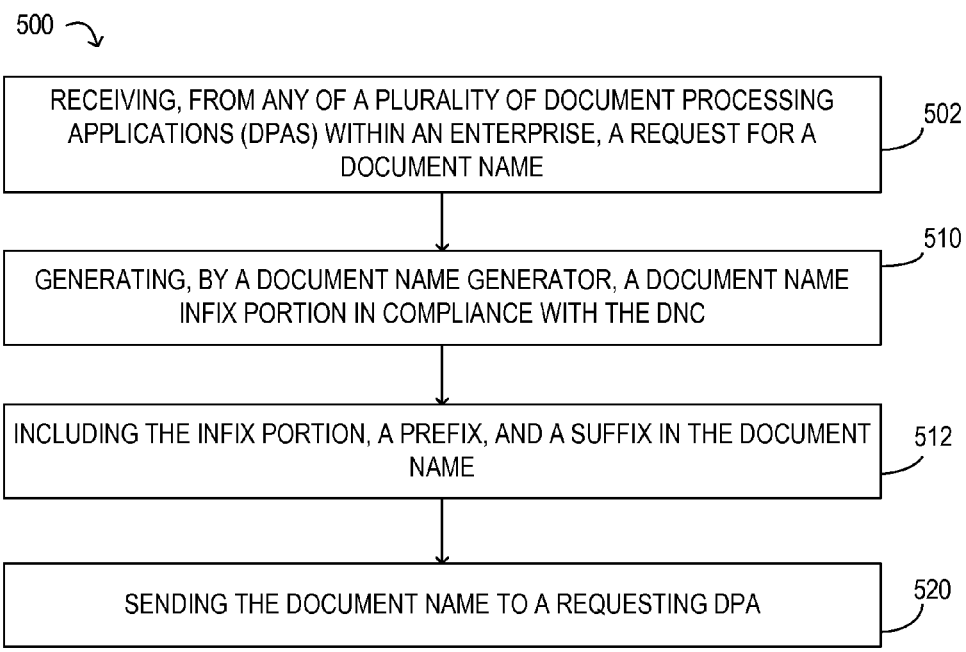
FIG. 5 is a flow diagram of selected elements of an embodiment of a document naming and document management method.

Turning now to FIG. 5, selected elements of an embodiment of a document naming method 500 are depicted. Method 500 represents functionality that may be implemented within a DNG 104, DNC Server 110, or distributed across both. In the depicted embodiment, method 500 includes receiving (block 502), from any of a plurality of DPAs within an enterprise, a request for a document name. The depicted embodiment of method 500 further includes generating (block 510), by a DNG, a document name infix portion in compliance with the DNC and including (block 512) the infix portion, a prefix, and a suffix in the document name. The document name is then sent (block 520) to a requesting DPA.

Figure 6:
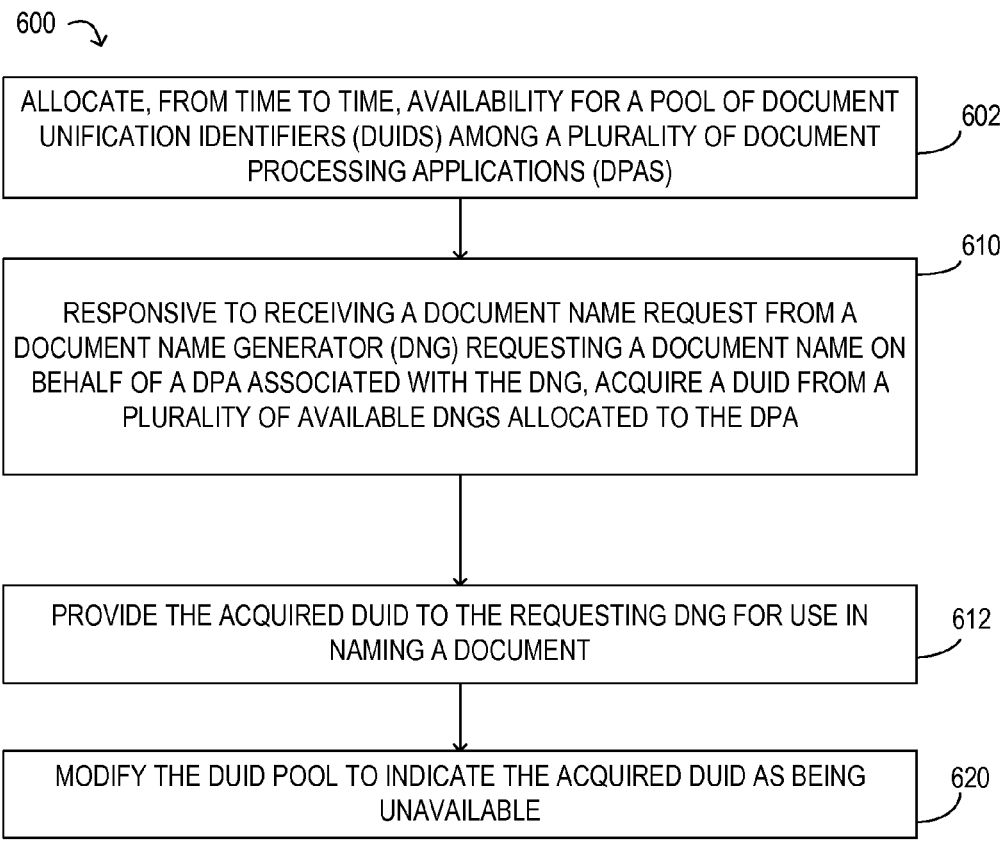
FIG. 6 is a flow diagram of selected elements of an embodiment of a document naming and document management method.

Referring now to FIG. 6, selected elements of an aspect of a document naming convention method 600 are shown. The functionality represented by method 600 may implemented within document numbering application 112 of DNC Server 110, which may be the centralized allocator of DUIDs and other portions of a DNC. In the depicted embodiment method 600 includes instructions to allocate (block 602), from time to time, availability for a pool of DUIDs among a plurality of DPAs. Responsive to receiving a document name request from a DNG requesting a document name on behalf of a DPA associated with the DNG, method 600 as shown includes instructions to acquire (block 610) a DUID from a plurality of available DNGs allocated to the DPA. As depicted in FIG. 6, the acquired DUID is then provided (block 612) to the requesting DNG for use in naming a document and the DUID pool is modified (block 620) to indicate the acquired DUID as being unavailable.

Figure 7:
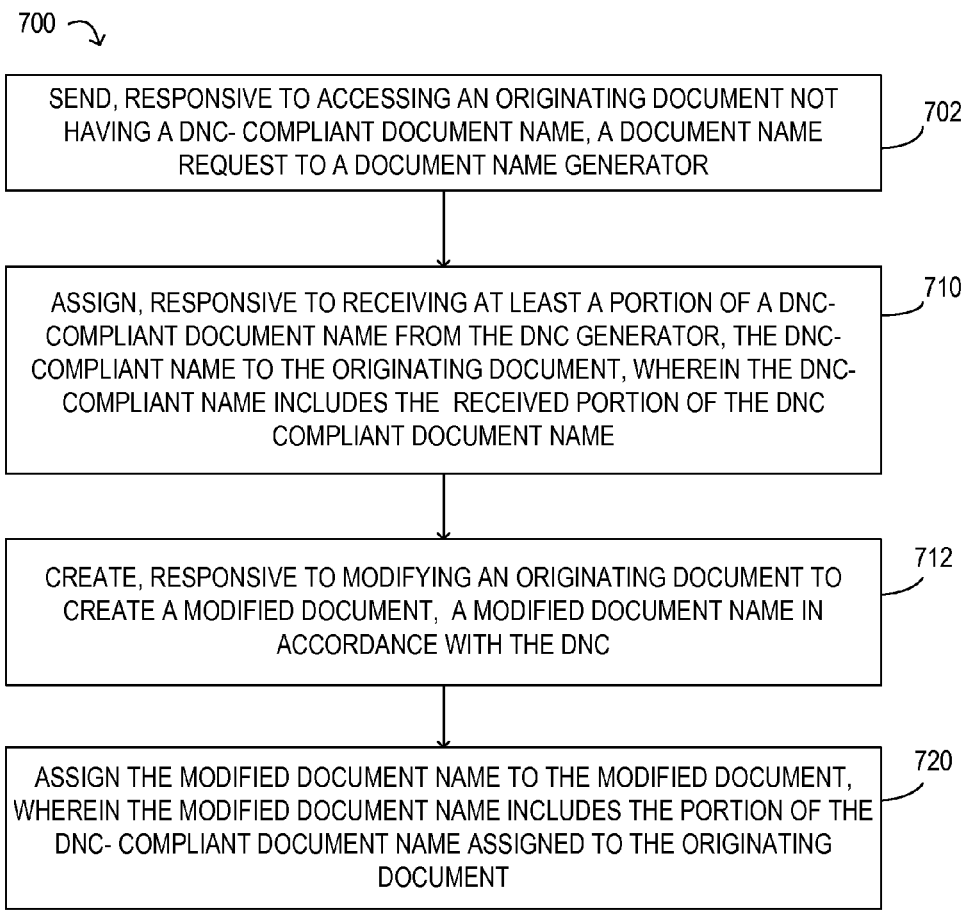
FIG. 7 is a flow diagram of selected elements of an embodiment of a document naming and document management method.

Referring now to FIG. 7, selected elements of an embodiment of a document naming convention method 700 are shown. The functionality represented in FIG. 7 may be implemented in a system that executes one or more DPAs 102, either as an aspect of a DPA itself or as an added feature. In the embodiment depicted in FIG. 7, method 700 includes sending (block 702), responsive to accessing an originating document not having a DNC-compliant document name, a document name request to a DNG. In response to receiving at least a portion of a DNC-compliant document name from the DNG, method 700 as depicted in FIG. 7 further includes assigning (block 710) the DNC-compliant name to the originating document, wherein the DNC-compliant name includes the received portion of the DNC-compliant document name. When a DPA modifies an originating document to create a modified document, method 700 includes creating (block 712) a modified document name in accordance with the DNC and assigning (block 720) the modified document name to the modified document, wherein the modified document name includes the portion of the DNC-compliant document name assigned to the originating document.

Figure 8:
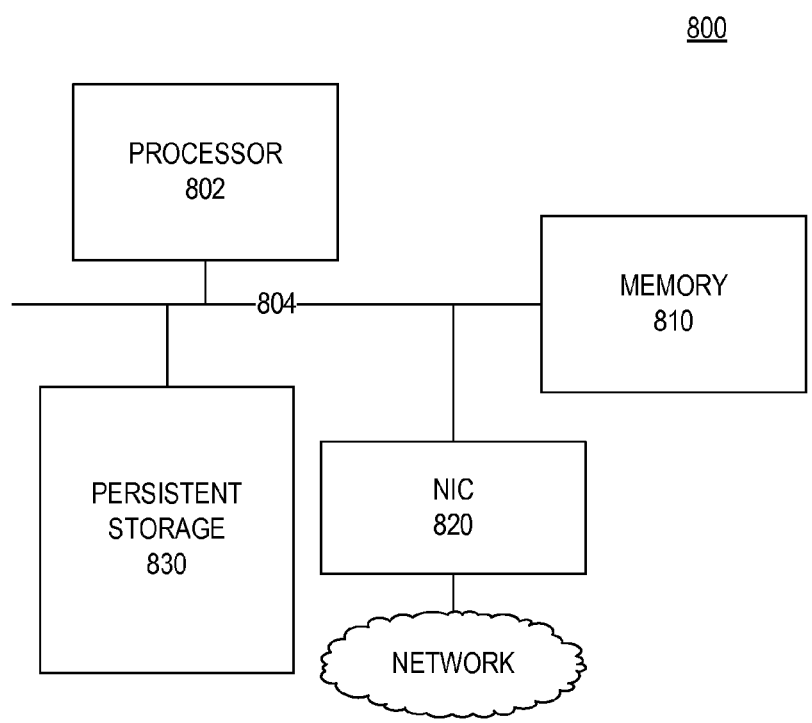
FIG. 8 is a block diagram depicting selected elements of an embodiment of a data processing system suitable for use in implementing the document naming convention in the enterprise of FIG. 1.

Referring now to FIG. 8, selected elements of a data processing system 800 suitable for implementing executing the document naming functionality described herein are illustrated. In some embodiments, for example, the functionality represented by DNC Server 110, DNG 104, or DPA 102 as shown in FIG. 1 may be implemented on a general purpose computer such as the data processing system 800 depicted in FIG. 1. It should be appreciated, however, that a single system implementation is just one alternative and, in other implementations, the functionality represented by DNC Server 110 may be implemented in multiple server systems.

As depicted in FIG. 8, data processing system 800 includes a general purpose processor 802 connected via a bus 804 to a system memory 810. A network adapter or network interface card (NIC) 820 and a persistent mass storage device (830) are also shown as being connected to bus 804. Persistent storage 830 may be implemented with a conventional magnetic disk drive. Alternatively, mass storage may be provided to system 800 via networked storage including, as examples, a storage area network (SAN) or network attached storage (NAS). System 800 may further include input devices (not depicted) including keyboards, a mouse, and so forth as well as output devices (not depicted) including a display terminal and one or more printers. Moreover, although system 800 in FIG. 8 may be implemented with a single machine or computer, other embodiments may employ a cluster or group of individual, but interconnected systems including server cluster implementations in which multiple individual processing boards are installed in a single chassis.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A data processing system including a processor having access to executable instructions, stored in a non-transitory computer readable medium, the instructions including instructions to:
   allocate, from time to time, in memory of a computer by a document naming convention (DNC) server, a pool of document unification identifiers (DUIDs) for use in naming documents by a plurality of document processing applications (DPAs) coupled to the DNC server;
   receive a document name request from a document name generator (DNG) requesting a document name on behalf of one of the DPAs;
   responsive to receiving the document name request, acquire an available DUID from the pool;
   provide the acquired DUID to the requesting DNG for use in naming a document, the DNG generating a name for the document and returning the generated name to the one of the DPAs, the one of the DPAs naming the document using the generated name; and
   modify the DUID pool to indicate the acquired DUID as being unavailable.

2. The system of claim 1, said instructions further comprising instructions to:
   generate a timestamp based on a time associated with the document name request; and
   provide the timestamp to the DNG.

3. The system of claim 2, wherein said instructions to provide the timestamp and the acquired DUID comprise instructions to include the acquired DUID and the timestamp in an infix portion of the name.

4. The system of claim 3, said instructions further comprising instructions to:
   generate a unique serial identifier (USI); and
   provide the USI to the DNG.

5. The system of claim 1, wherein said instructions to allocate comprise instructions to allocate an availability of DUIDs in the pool based on an expected number of document naming requests associated with the DPAs.

* * * * *